US012783422B2

(12) United States Patent
Shannon

(10) Patent No.: US 12,783,422 B2
(45) Date of Patent: Nov. 3, 2026

(54) MULTI-CORE PROCESSORS EVICTING CACHE LINES FROM LOWER-LEVEL CACHES TO HIGHER-LEVEL CACHES BY CORE-TO-CORE TRANSFERS

(71) Applicant: Ampere Computing LLC, Santa Clara, CA (US)

(72) Inventor: Richard James Shannon, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 177 days.

(21) Appl. No.: 18/603,147

(22) Filed: Mar. 12, 2024

(65) Prior Publication Data

US 2025/0291733 A1 Sep. 18, 2025

(51) Int. Cl.
*G06F 12/0891* (2016.01)
*G06F 12/0897* (2016.01)

(52) U.S. Cl.
CPC ...... *G06F 12/0891* (2013.01); *G06F 12/0897* (2013.01)

(58) Field of Classification Search
CPC ............. G06F 12/0811; G06F 12/0891; G06F 12/0897
See application file for complete search history.

(56) References Cited

U.S. PATENT DOCUMENTS

2009/0106494 A1* 4/2009 Knebel ................. G06F 12/128 711/119
2010/0228922 A1* 9/2010 Limaye ................. G06F 12/126 711/135
2014/0189239 A1* 7/2014 Hum ................... G06F 12/0811 711/122
2021/0216464 A1* 7/2021 Uhrenholt ........... G06F 12/0891

OTHER PUBLICATIONS

Arm, “AMBA® CHI Architecture Specification,” Document No. IHI0050, Release G, Mar. 2024, Arm Limited, available online: [URL: https://developer.arm.com/documentation/ihi0050/g/?lang=en], 585 pages.

* cited by examiner

*Primary Examiner* — Aracelis Ruiz
(74) *Attorney, Agent, or Firm* — Withrow & Terranova, PLLC

(57) ABSTRACT

To reduce a number of cache line transfers in a multi-core processor that includes a cache manager circuit to manage coherence of a cache memory system, a source central processing unit (CPU) core that is evicting a cache line from an associated lower-level cache memory transfers the evicted cache line to another core for storage in a “slice” of a higher-level cache memory associated with the other core, rather than to the cache manager circuit. In some examples, the cache manager circuit receives a request for the eviction, determines which CPU core will store the target CPU core for the evicted cache line, and notifies the source CPU core of the identification of the target CPU core. In some examples, the cache manager circuit informs the target CPU core that the evicted cache line will be transferred.

21 Claims, 5 Drawing Sheets

Figure 1:
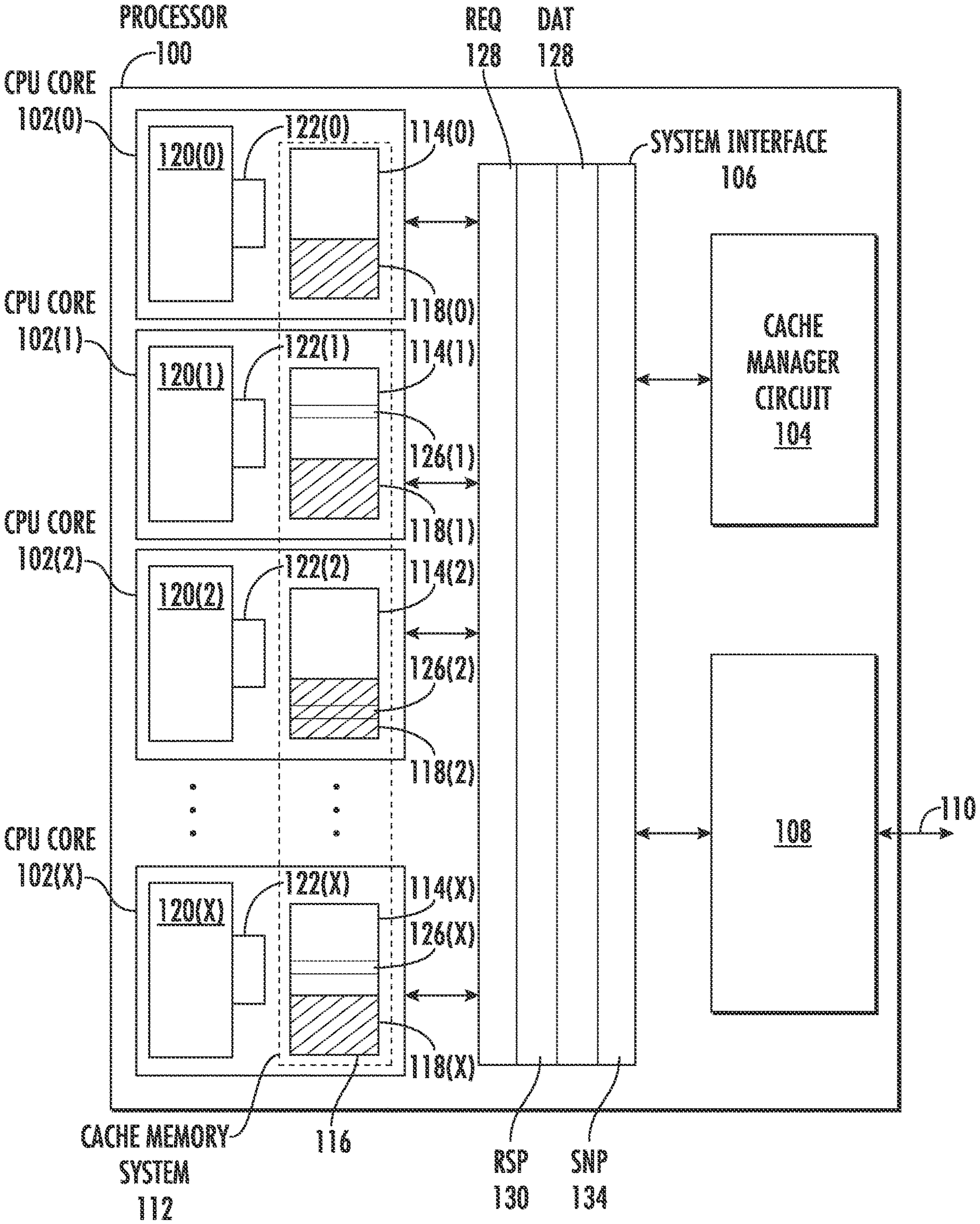

MULTI-CORE PROCESSORS EVICTING CACHE LINES FROM LOWER-LEVEL CACHES TO HIGHER-LEVEL CACHES BY CORE-TO-CORE TRANSFERS

FIELD OF THE DISCLOSURE

The technology of the disclosure relates to a multi-core processor including a cache memory system, including lower-level caches in each core and a higher cache level comprised of slices in each core, and in particular to evicting a cache line from a lower-level cache to the higher level cache.

BACKGROUND

To provide low-latency retrieval of instructions and/or data (as compared to the latency of transactions on a main memory system), microprocessors may include a cache memory system. The cache memory system includes one or more cache memories (also referred to as "caches") that may be arranged in a hierarchical manner. For example, the cache memory system may include one or more levels of cache(s) within a central processing unit (CPU) core, such as a level 0 (L0) cache or a level 1 (L1) cache as a lowest level and, in some examples, up to a level 2 (L2) cache or higher (e.g., level 3 (L3) cache) associated with the same CPU core. In each CPU core or processor, a lower-level cache is used to store frequently accessed data to improve performance. The lower-level cache may be the relatively smallest and lowest latency cache, with the caches increasing in size and latency up through the L3 cache, which may be the largest but with the longest latency compared to the other caches. In some instances, information stored in a particular cache may include instructions and/or data, and in other instances, the instructions and data may each be stored in separate dedicated caches at a given cache level. One or more lower cache levels of a cache memory system may be "private" to the CPU core (meaning that such private caches are only visible and accessible to the associated microprocessor or individual core(s)), while another level of cache may be shared among multiple cores in a multi-core microprocessor. In some examples, a cache level physically located on one core may be shared with other cores. In other examples, a cache level of a cache memory system may be distributed across multiple cores in a processor by having "slices" of physical cache space on each core.

Data coherence or cache coherence must be maintained within a cache memory system. Data coherence refers to the consistency of data stored in different caches within a cache memory system. The goal of cache coherence is to ensure that all requesters of data in a processor or system use a same version of the data stored at a particular memory address, despite the presence of multiple caches and multiple cache levels that can store copies of data having the same memory address. When multiple cores or processors access the same physical memory address and one or more of the cores or processors updates the data, there may be different (inconsistent) versions of the data in the caches on different cores. Cache coherency mechanisms are put in place to prevent or resolve these inconsistencies. For example, the Advanced Microprocessor Bus Architecture (AMBA) coherent hub interface (CHI) specification from Arm Holdings, plc defines a hardware-based protocol for maintaining coherency of a system memory address space across multiple caching agents (e.g., CPU cores) in a processor-based system. The AMBA CHI specification involves a system of components in a processor-based system having specific roles and responsibilities to maintain cache coherency in a cache memory system in the processor-based system. The AMBA CHI specification calls for a hardware coherency manager (also known as a "home node" or "home agent") to be defined as the point of coherence (PoC) for the cache memory system. The hardware coherency manager is responsible for ensuring coherency for a set of system addresses in the processor-based system. According to the architecture in the AMBA CHI specification, if caches local to a requesting node (e.g., a CPU core requesting data from a particular memory address) do not contain requested data, the requesting node sends a cache request to the hardware coherency manager as the sole coherency manager. The hardware coherency manager then issues snoop requests to other remote nodes as dictated by the AMBA CHI protocol.

For example, in a single-socket processor-based system wherein the CPU cores are provided in a single semiconductor die ("die"), the hardware coherency manager can communicate snoop requests to the CPU cores within the single die. In another example, when a cache line needs to be evicted from a local cache in a CPU core (e.g., because the CPU core has requested new data that needs to be stored in the local cache, but the local cache is full), the CPU core sends an instruction to the hardware coherency manager (aka "host node") to handle the eviction. The response by the host node may depend on whether the evicted cache line has been updated (e.g., dirty) and may involve communicating snoop requests to the other CPU cores.

SUMMARY

Aspects disclosed herein include multi-core processors evicting cache lines from lower-level caches to higher-level caches by direct core-to-core transfers. Related methods of transferring evicted cache lines from one core to another core in a multi-core processor are also disclosed. In this regard, to reduce a number of cache line transfers in a multi-core processor that includes a cache manager circuit to manage coherence of a cache memory system, a source central processing unit (CPU) core that is evicting a cache line from an associated lower-level cache memory transfers (e.g., directly) the evicted cache line to another core for storage in a "slice" of a higher-level cache memory associated with the other core, rather than transmitting the evicted cache line to the cache manager circuit. In some examples, the cache manager circuit receives a message indicating the eviction, identifies a slice of the higher-level cache in a target CPU core to store the evicted cache line, and notifies the source CPU core of the identification of the target CPU core. In some examples, the cache manager circuit communicates with the target CPU core to which the evicted cache line will be transferred.

In this regard, in one exemplary aspect, a processor is disclosed. The processor includes a cache memory system, including a plurality of lower-level cache memories, and a higher-level cache memory, including a plurality of slices that each provide a portion of the higher-level cache memory. The processor further includes a cache manager circuit configured to maintain data coherence in the cache memory system, and a plurality of central processing unit (CPU) cores each associated with a corresponding one of the plurality of lower-level cache memories and a corresponding slice of the plurality of slices of the higher-level cache memory. The first CPU core of the plurality of CPU cores is configured to determine to evict a first cache line from an associated lower-level cache memory of the plurality of lower-level cache memories, identify a second CPU core of the plurality of CPU cores including an associated first slice of the plurality of slices in which to store the first cache line and transmit the first cache line to the second CPU core for storage in the first slice.

In another exemplary aspect, a method to evict a first cache line from a lower-level cache memory associated with a first central processor unit (CPU) core among a plurality of CPU cores of a processor is disclosed. The method includes determining, in the first CPU core, to evict the first cache line from an associated lower-level cache memory among a plurality of lower-level cache memories in a cache memory system; identifying a first slice of a plurality of slices of a higher-level cache associated with a target CPU core in which to store the first cache line; and transmitting the first cache line to the target CPU core among the plurality of CPU cores for storage in the first slice.

In another exemplary aspect, a non-transitory computer-readable medium having stored thereon computer-executable instructions is disclosed. When executed by a multi-core processor, the instructions cause the multi-core processor to evict a first cache line from a lower-level cache memory associated with a first central processor unit (CPU) core among a plurality of CPU cores of the multi-core processor. The instructions further cause the multi-core processor to determine, in the first CPU core, to evict the first cache line from the associated lower-level cache memory among a plurality of lower-level cache memories in a cache memory system, identify a first slice of a plurality of slices of a higher-level cache associated with a target CPU core in which to store the first cache line; and transmit a first cache line to the target CPU core among the plurality of CPU cores for storage in the first slice.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 2:
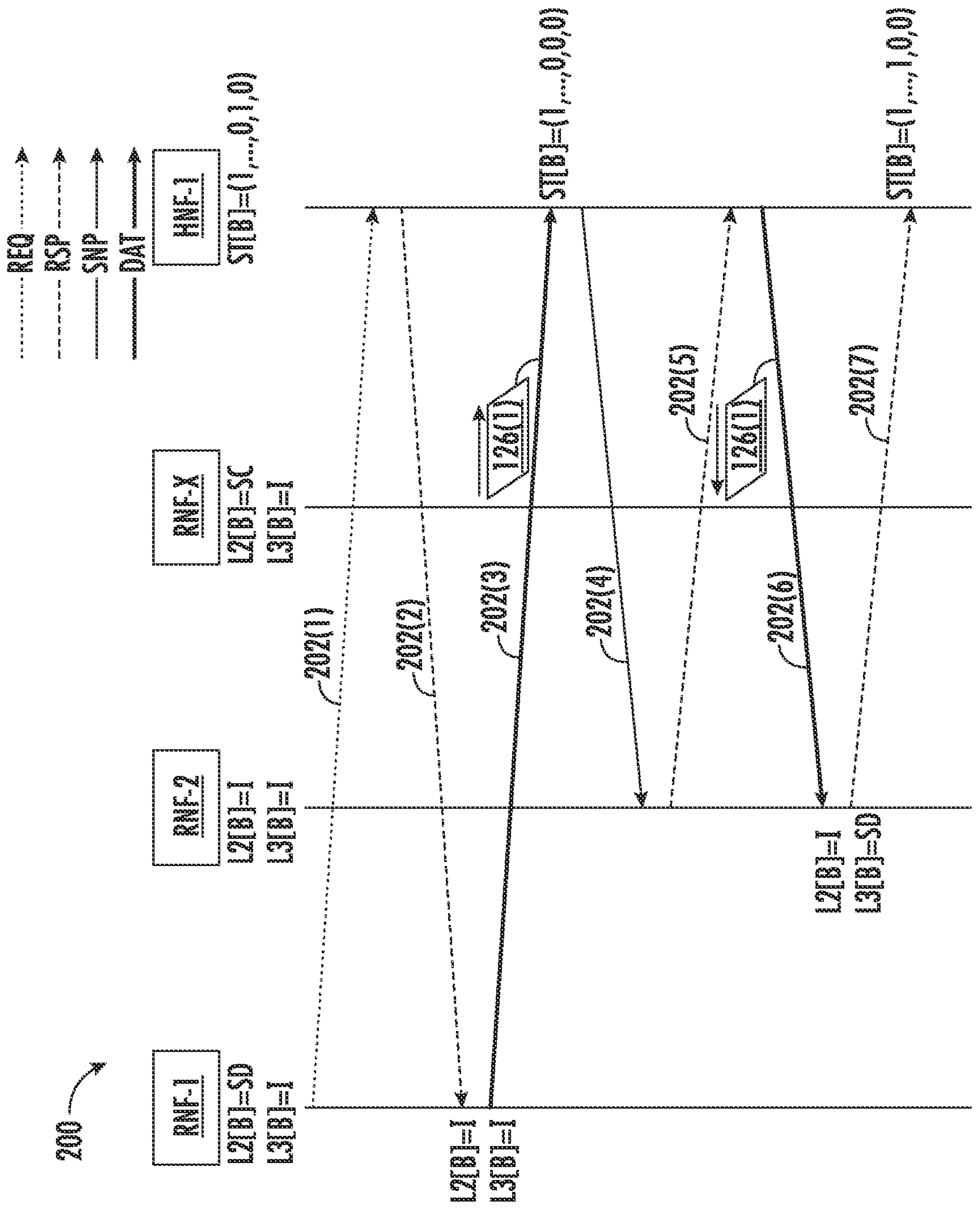
Figure 3:
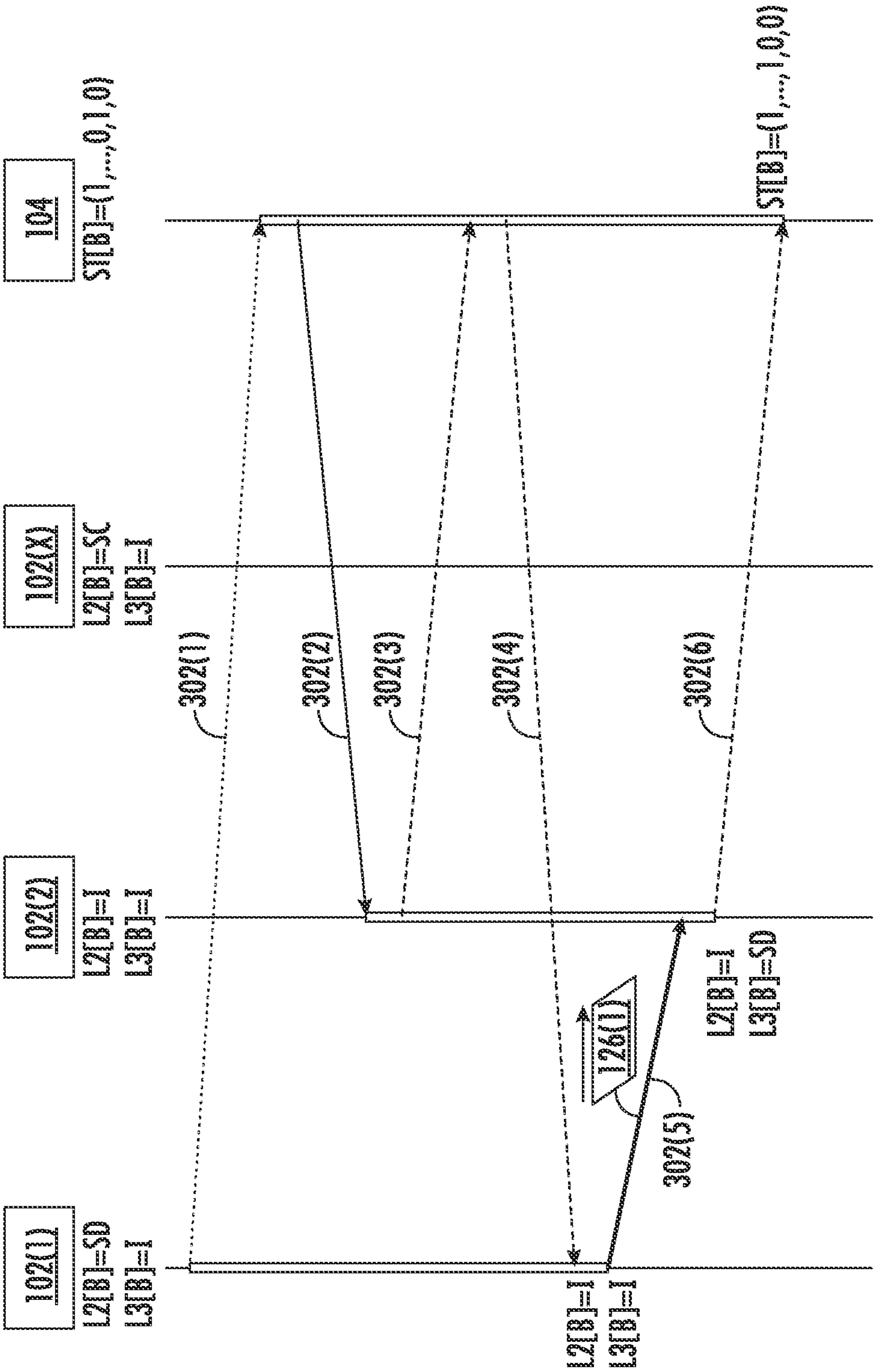
Figure 4:
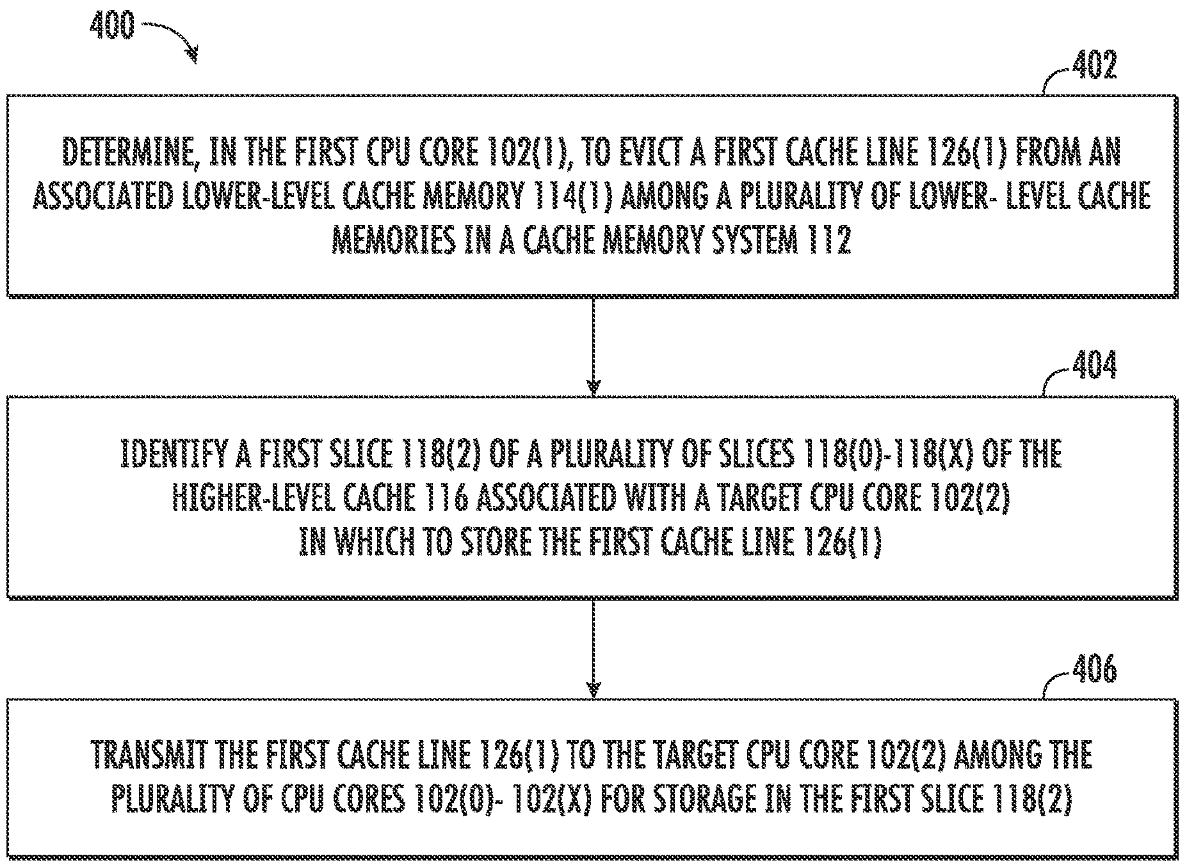
Figure 5:
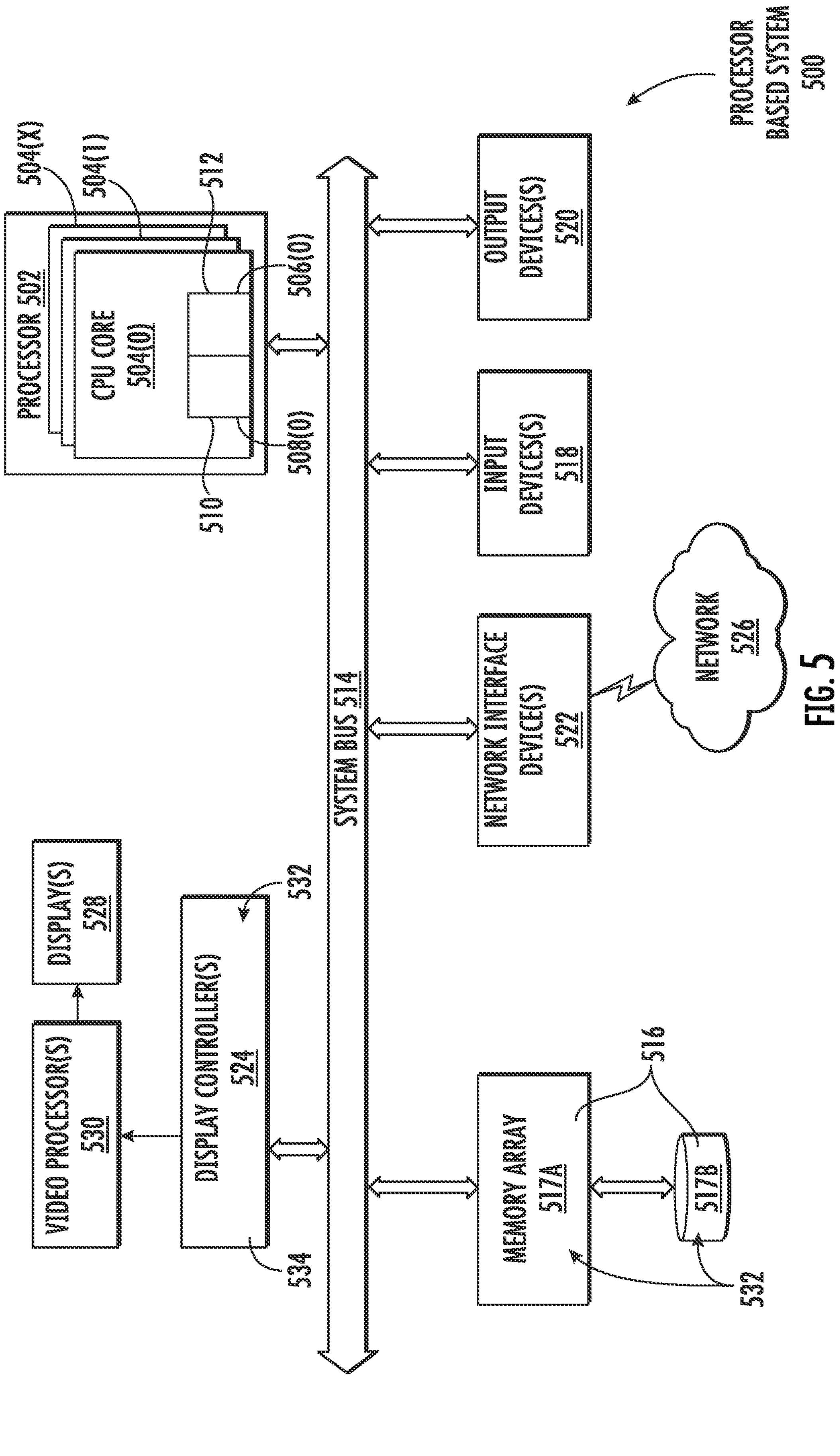

FIG. 1 is a block diagram of an exemplary processor including multiple central processing unit (CPU) cores and a cache manager circuit coupled to a system interface, wherein each CPU core has an associated lower-level cache memory and an associated slice of a shared, distributed higher-level cache memory that are included in a cache memory system managed by the cache manager circuit;

FIG. 2 is a flow diagram illustrating communications in a conventional processor having CPU cores and a cache manager circuit coupled to a system interface configured as in FIG. 1, but wherein the CPU cores employ a conventional protocol for eviction of a cache line from a lower-level cache associated with a source CPU core to a higher-level cache associated with a target CPU core by first transferring the cache line to a cache manager circuit;

FIG. 3 is a flow diagram illustrating communications in the exemplary processor of FIG. 1 wherein a source CPU core employs an exemplary protocol for eviction of a cache line from an associated lower-level cache to a higher-level cache associated with a target CPU core, which includes transferring (e.g., directly) the evicted cache line on the system interface from the source CPU core to the target CPU core;

FIG. 4 is a flow chart of an exemplary process in a multi-core processor such as the processor in FIG. 1, in which the CPU core evicts a cache line, the process including a transfer of the evicted cache line from a lower-level cache associated with a source CPU core to a slice of a higher-level cache memory associated with a target CPU core according to an exemplary protocol disclosed herein, to reduce the number of transfers on a system interface compared to the conventional protocol; and FIG. 5 is a block diagram of another computer system that includes a processor-based system in which an exemplary processor includes a plurality of CPU cores and a cache manager circuit coupled to a system interface, wherein each CPU core has an associated lower-level cache memory and an associated slice of a higher-level cache memory and each CPU cores is configured to evict a cache line including transferring the cache line from core to core to reduce data transfers compared to a conventional protocol.

DETAILED DESCRIPTION

Aspects disclosed herein include multi-core processors evicting cache lines from lower-level caches to higher-level caches by direct core-to-core transfers. Related methods of transferring evicted cache lines from one core to another core in a multi-core processor are also disclosed. In this regard, to reduce a number of cache line transfers in a multi-core processor that includes a cache manager circuit to manage coherence of a cache memory system, a source central processing unit (CPU) core that is evicting a cache line from an associated lower-level cache memory transfers (e.g., directly) the evicted cache line to another core for storage in a "slice" of a higher-level cache memory associated with the other core, rather than transmitting the evicted cache line to the cache manager circuit. In some examples, the cache manager circuit receives a message indicating the eviction, identifies a slice of the higher-level cache in a target CPU core to store the evicted cache line, and notifies the source CPU core of the identification of the target CPU core. In some examples, the cache manager circuit communicates with the target CPU core to which the evicted cache line will be transferred.

FIG. 1 is a block diagram of an exemplary multi-core processor 100 ("processor 100"), including central processing unit (CPU) cores 102(0)-102(X) (where "X" may be any positive integer) that may be configured to execute instructions in parallel to provide a high level of computing performance. The CPU cores 102(0)-102(X) communicate with each other and with a cache manager circuit 104 by way of a system interface 106. The processor 100 also includes an external interface circuit 108 coupled to the system interface 106 and to an external interface 110. The external interface 110 may couple to other processors and a system memory in a computing system (not shown) or to other external circuits. The processor 100 includes a cache memory system 112, which includes lower-level cache memories 114(0)-114(X) and a higher-level cache memory 116, that temporarily stores information (e.g., instructions and/or data) for use by the CPU cores 102(0)-102(X). The information may be obtained from a system memory or an even higher-level of cache in the cache memory system 112 and may be stored in quantities of cache lines, which includes a number (e.g., 64 or 128) of bytes that may be system dependent. The higher-level cache memory 116 is implemented as a plurality of slices 118(0)-118(X), and each provides a portion of the address space of the higher-level cache memory 116. The cache manager circuit 104 manages data coherence among the lower-level cache memories 114(0)-114(X) and the higher-level cache memory 116. The CPU cores 102(0)-102(X) include execution circuits 120(0)-120(X) and cache control circuits 122(0)-122(X), which control transfers between the execution circuits 120(0)-120(X) and the lower-level cache memories 114(0)-114(X) and transfers between the execution circuits 120(0)-120(X) and the higher-level cache memory 116.

The lower-level cache memories 114(0)-114(X) are respectively associated with the CPU cores 102(0)-102(X). That is, the lower-level cache memories 114(0)-114(X) may be employed by the CPU cores 102(0)-102(X) as dedicated local caches. For this reason, the lower-level cache memories 114(0)-114(X) may be located close to or within an associated one of the CPU cores 102(0)-102(X). Each one of the slices 118(0)-118(X) is also associated with one of the CPU cores 102(0)-102(X) and may also be physically close to or within the one of the CPU cores 102(0)-102(X) it is associated with. In some examples, the lower-level cache memories 114(0)-114(X) and the slices 118(0)-118(X) may be implemented in the same physical memory in each CPU core. For example, storage space in a physical memory may be divided in a configurable manner between the lower-level cache memory 114(X) and the slice 118(X) of the higher-level cache memory 116. The physical memories may be located in close proximity to the execution circuits 120(0)-120(X) and may be accessed by the cache control circuits 122(0)-122(X).

The lower-level cache memories 114(0)-114(X) may not be the lowest level of cache memory associated with the CPU cores 102(0)-102(X). For example, the lower-level cache memories 114(0)-114(X) may be level 0 (L0) or level 1 (L1) cache memories but may alternatively be level two (L2) cache memories (or higher) if the CPU cores 102(0)-102(X) have internal cache memories (not shown). In any case, the lower-level cache memories 114(0)-114(X) provide a lower level of caching than the higher-level cache memory 116.

As the CPU cores 102(0)-102(X) access their associated lower-level cache memories 114(0)-114(X) and slices 118(0)-118(X), the cache manager circuit 104 may be employed to maintain data coherence across the cache memory system 112. To this end, each of the CPU cores 102(0)-102(X) maintains status indicators about each cache line in their associated lower-level cache memories 114(0)-114(X) and in their associated one of the slices 118(0)-118(X) of the higher-level cache memory 116. The status indicators are updated upon each access to the cache memory system 112 to provide current information about the cache lines. As an example, FIG. 1 shows a cache line 126(1) in the lower-level cache memory 114(1) in CPU core 102(1), cache line 126(2) in the slice 118(2) in the CPU core 102(2), and cache line 126(X) in the lower-level cache memory 114(X) in the CPU core 102(X). The data stored in the cache line 126(1) will also be referred to herein as "cache line 126(1)."

As in any cache system, the lower-level cache memories 114(0)-114(X) may be empty when initialized (e.g., at system power-on) but immediately begin to be filled as the CPU cores 102(0)-102(X) fetch instructions and data (e.g., from the system memory) for processing. The information stored at some memory addresses may be shared among the CPU cores 102(0)-102(X). Thus, the status indicators of the cache lines storing such information are updated to reflect the shared status. During normal operation of a parallel processing system, more than one of the CPU cores 102(0)-102(X) may access information at a same memory address. In such cases, copies of that information may be stored in cache lines of more than one of the lower-level cache memories 114(0)-114(X). If the copy of data stored in a cache line of the lower-level cache memory 114(1), for example, is partially modified or overwritten entirely by the CPU core 102(1), the status indicators about that cache line are updated with a "dirty" indication, for example, so the cache manager circuit 104 can be made aware of this and can use this information to ensure that the same data is used by all of the CPU cores 102(0)-102(X). In this regard, the cache manager circuit 104 can invalidate all the cache lines containing the unmodified versions to force all the CPU cores 102(0)-102(X) to request the modified version of that data if they need it again. However, the other cores are not allowed to further modify the data in such circumstance.

Continuing the above example, eventually the lower-level cache memory 114(1) will be filled and, when new data is requested from system memory, space can be made for storing the new data by evicting one or more of the cache lines in the lower-level cache memory 114(1). As an aside, the selection of which cache lines to evict is an extensive topic that is not elaborated on here, but typically, efforts are made to evict information that is least likely, among all the information stored in the lower-level cache memory, to be needed in the near term. If the information in the evicted cache line was never modified, it may simply be overwritten, but if the information in the evicted cache line was modified, it needs to be preserved for use by the other CPU cores 102(0)-102(X) that may need to further modify it. This can be accomplished by writing the updated information back to the system memory or (to keep it close by) to a higher-level memory cache for access by the CPU cores 102(0)-102(X). This is managed by the cache manager circuit 104.

In an example, if a modified version of the data in a cache line corresponding to a particular memory address is stored in the lower-level cache memory of a first CPU core, the first CPU core is the CPU core that modified the data, and the first CPU core determines that the cache line needs to be evicted from its lower-level cache memory, the cache manager circuit employing a conventional protocol may obtain a copy of the modified version (e.g., from the first CPU core) and store the modified version in the higher-level cache memory 116 where it may be obtained by all the CPU cores 102(0)-102(X). In some examples, other ones of the CPU cores 102(0)-102(X) may also have a copy of the modified version of the data but are not allowed to further modify it unless authorized by the cache manager circuit. In the system in FIG. 1, writing the modified version to the higher-level cache memory 116 includes writing the updated version to one of the slices 118(0)-118(X), as determined by the cache manager circuit 104.

The system interface 106 employed in the exemplary processor 100 may be any mesh network or appropriate system bus. In some examples, as shown in FIG. 1, the system interface 106 comprises multiple channels coupled to each of the CPU cores 102(0)-102(X), the cache manager circuit 104, and the external interface 110. Each channel may be employed for communicating particular types of messages. For example, the system interface 106 in FIG. 1 may include a Request channel (REQ) 128, a Response channel (RSP) 130, a Data channel (DAT) 132, and a Snoop channel (SNP) 134, which may correspond to channels in the AMBA CHI interface.

FIG. 2 is a flow diagram 200 illustrating messages transferred over a system interface in a conventional processor having CPU cores RNF-0 to RNF-X, as well as a cache manager circuit (home node) HNF-1 interconnected by a system interface (not shown) configured as in the processor 100 in FIG. 1, but employing a conventional protocol for eviction of a cache line from a lower-level cache memory associated with a source CPU core to a higher-level cache memory associated with a target CPU core, which includes two transfers of the evicted cache line on the system interface. The lower-level cache is referred to as "L2" in this example, and the higher-level cache memory is referred to as "L3" in this example, referring to level 2 and level 3 cache memories, respectively, but the operations are not dependent on these specific cache levels. Since CPU core RNF-0 is not involved in the eviction of the cache line in this example, CPU core RNF-0 is not shown in FIG. 2.

The message transfers shown in FIG. 2 are employed for handling a cache line eviction from a lower-level cache memory to a higher-level cache memory, including two transfers of the evicted cache line, based on a conventional AMBA CHI protocol. The higher-level cache memory (L3) is distributed (e.g., in slices) among the CPU cores RNF-0 to RNF-X, and cache coherence in the processor is managed by home node HNF-1. The conventional processor described in the flow diagram 200 may be structured similarly to the exemplary processor 100 in FIG. 1 but employs the conventional AMBA CHI protocol, which is described here for purposes of comparison to the exemplary processor 100. The flow diagram includes status indicators for cache lines affected by transactions in the lower-level cache memories (L2 cache memories in this example) and cache lines of slices of the higher-level cache memory (L3 cache memory in this example) in each of the "CPU cores" RNF-1, RNF-2, and RNF-X.

The flow diagram 200 includes messages 202(1)-202(7), which may be instructions (commands or requests) and/or data, shown as arrowed lines from a source node of the message to a destination or target node of the message. The messages 202(1)-202(7) in FIG. 2 are in chronological order from top to bottom. At an initial state (i.e., before message 202(1)), status indicators "L2[B]=SD" and "L3[B]=I" give the status of cache lines containing information from memory address "B" in the lower-level cache memory (L2) and the slice of the higher-level cache memory (L3) associated with the CPU core RNF-1. The status "SD" of the lower-level cache memory indicates that the information from address "B" is shared ("S"=shared) with other CPU cores and has been modified by the CPU core RNF-1 ("D"=dirty). The status "I" of that cache line in the higher-level cache memory indicates that information for the address ("B") is invalid ("I"=invalid), meaning that there is not a valid copy of the information for address "B" stored in the higher-level cache memory (L3). Since the information of the memory address "B" stored in the lower-level cache memories 114(0)-114(X) is a number of bytes of binary data referred to as a cache line, the terms "information" and "cache line" may be used interchangeably in the following description of flow diagram 300.

Status indicators of the CPU core RNF-2 indicate that, in the initial state, CPU core RNF-2 does not contain a valid copy of the information for address "B" in either the lower-level cache memory (L2) or the higher-level cache memory (L3). Status indicators of the core RNF-X indicate that the lower-level cache memory (L2) contains the modified version (modified by CPU core RNF-1) of the information from memory address "B," which is shared ("S") and has not been further modified (i.e., "C"=clean). A status indicator "ST[B]=1, . . . , 0, 1, 0" in the home node HNF-1 includes indicators corresponding to each of the CPU cores RNF-0 to RNF-X for the information of memory address "B." Specifically, a "1" in the left-most position indicates that a copy is stored in the CPU core RNF-X. The remaining bit positions, from right to left, indicate that CPU cores RNF-0 and RNF-2 do not have a valid copy, and CPU core RNF-1 does have a valid copy of the information in memory address "B." The status of CPU cores RNF-3 to RNF-(X−1), if they exist, are not indicated but it is assumed for this example that they do not contain information for memory address "B."

The example in FIG. 2 is based on a scenario in which the CPU core RNF-1 has determined that it is necessary to evict the cache line storing information for memory address "B" from its associated L2 cache memory and the information has been modified (e.g., is "dirty"). The message 202(1) is directed to the home node HNF-1, which manages cache coherence, to inform the home node HNF-1 of the need to evict the cache line at address "B". The messages 202(1)-202(7) are transmitted through one or more communication channels of a bus or mesh network, for example, that may be coupled to each of the CPU cores RNF-0 to RNF-X and the home node HNF-1. The message 202(1) may include a target identifier to indicate that the home node HNF-1 is the target for the message 202(1).

In response to message 202(1), the home node HNF-1 generates a message 202(2), which is directed back to the CPU core RNF-1 to instruct the CPU core RNF-1 to transmit the cache line for memory address "B" to the home node HNF-1. The CPU core RNF-1 responds with message 202 (3), which is a transfer of the modified information in the cache line for memory address "B," and the host node HNF-1 is the designated target for such transfer. The CPU core RNF-1 also updates the status indicators ("L2[B]=I") to indicate that information for memory address "B" is invalid in the L2 cache memory. If the CPU core RNF-1 needs the information for memory address "B" again, it will have to be obtained (e.g., read) from the cache memory system or system memory.

As the home node HNF-1 is the cache manager circuit, it determines where to store the modified information for address "B." In some cases, the modified information may be immediately written back to a system memory. Additionally or alternatively, the home node HNF-1 may determine to write the modified information for memory address "B" into the L3 cache memory. The home node HNF-1 also determines which slice of the L3 cache memory will be employed to store the modified information for memory address "B." After such determinations, the home node HNF-1 generates message 202(4) to transfer the modified information for memory address "B" from the home node HNF-1 to the CPU core RNF-2. The home mode HNF-1 also updates its status indicators for memory address "B" to indicate that CPU core RNF-1 no longer contains a valid copy.

The message 202(4) indicates to the CPU core RNF-2 (i.e., the target) that the information for memory address "B" is to be stored in the slice of the L3 cache memory associated with the CPU core RNF-2. The CPU core RNF-2 responds with message 202(5), confirming to the home node HNF-1 that the CPU core RNF-2 is ready to receive the transmission of the information for memory address "B." The CPU core RNF-2 may generate the message 202(5) if there is an available cache line in the associated L3 cache memory slice. The message 202(5) may be a read instruction directed to the home node HNF-1, requesting the information for the memory address "B," where it is being temporarily stored, for example.

In response to the message 202(5), the home node HNF-1 generates message 202(6), which is a transfer of the modified information for memory address "B" (e.g., the cache line), which was evicted from the CPU core RNF-1. The CPU core RNF-2 stores the modified information of memory address "B" in a cache line of a slice of the L3 cache memory and updates the status to "L3[B]=SD" because the information is shared and is modified (dirty) compared to the version in memory. Finally, the eviction of the cache line in CPU core RNF-1 is concluded by a message 202(7), which is a confirmation or acknowledgment from the CPU core RNF-2 to the home node HNF-1 indicating the information for memory address "B" was successfully received. The home node HNF-1 updates the status to "ST[B]=(1, . . . , 1, 0, 0)" to indicate that both CPU cores RNF-X and RNF-2 have versions of the information for memory address "B."

As shown in FIG. 1, and as described above, eviction of information for memory address "B" according to the AMBA CHI protocol includes two (2) transfers (i.e., message 202(3) and message 202(6)) of the modified information for memory address "B." Thus, for every cache line eviction that occurs in a processor operating according to the AMBA CHI protocol, which may happen many times with each transition between different virtual machines (VMs), there is a total of seven messages 202(1)-202(7), two of which are information transfers. Each transfer consumes power and increases congestion on the system interfaces.

FIG. 3 is a flow diagram 300 illustrating transfers of messages 302(1)-302(6) in the exemplary multi-core processor 100 of FIG. 1 employing an exemplary protocol for eviction of the cache line 126(1) from the lower-level cache memory 114(1) associated with a "source" CPU core 102(1) to a slice 118(1) of the higher-level cache memory 116 associated with a "target" CPU core 102(X) by a core-to-core transfer of the evicted cache line on the system interface 106. The CPU cores 102(0)-102(X) are provided in the processor 100 for executing instructions to perform computer-related tasks, such as CPU tasks, graphics processing unit (GPU) tasks, and the like. The processor 100 may include any number of cores "X+1", where "X" is a positive integer.

The flow diagram 300 corresponds to the flow diagram 200 in FIG. 2 with regard to providing representations of status indicators "L2[B]" showing the status of cache lines 126(1) and 126(X) in the lower-level cache memories 114(1) and 114(X) containing information corresponding to a memory address "B," and status indicators "L3[B]" showing the status of the cache line 126(2) of the slice 118(2) containing information corresponding to memory address "B." In this context, "B" represents any address in a range of memory addresses of a system memory, which may be aligned to a cache line boundary. FIG. 3 also includes status indicators "ST[B]" stored in the cache management circuit 104 to indicate the status of cache lines corresponding to memory address "B" stored in the lower-level cache memories 114(0)-114(X) and the higher-level cache memory 116. The flow diagram 300 is provided to show the messages 302(1)-302(6) employed in the processor 100 according to an exemplary protocol to execute an eviction of the cache line containing information of a memory address "B" from CPU core 102(1). The messages 302(1)-302(6) may be transmitted on the system interface 106 in FIG. 1, and in particular across the Request channel 128, the Response channel 130, the Data channel 132, and the Snoop channel 134. The eviction was accomplished by messages 202(1)-202(7) employing a conventional protocol, as illustrated in the flow diagram in FIG. 2.

The flow diagram 300 includes messages 302(1)-302(6), which may be instructions (commands or requests) and/or data transferred through the system interface 106 and shown as arrowed lines in FIG. 3 from a source CPU node to a destination or target CPU node of the message. The messages 302(1)-302(6) are in chronological order from top to bottom in FIG. 3 and include only one transfer of the cache line corresponding to memory address "B," which is one fewer transfer of the cache line for memory address "B" than in the flow diagram 200 in FIG. 2, thereby reducing power consumption and congestion in the system interface 106.

The example in FIG. 3 is based on a scenario in which the CPU core 102(1) ("source CPU core") has determined it is necessary to evict the cache line containing information for memory address "B" from the lower-level cache memory 114(1) associated with the CPU core 102(1). As indicated by the status indicators "L2[B]=SD", the information of memory address "B" may be shared among the CPU cores 102(1)-102(X) and is dirty (e.g., has been modified) since initially being read from the memory address "B" of the system memory or from a higher-level cache memory. The indicator "L3[B]=I" indicates that the higher-level cache memory 116 does not contain a valid version of the cache line corresponding to memory address "B". Initially, the CPU core 102(2) does not contain a valid version of the cache line for memory address "B" in either the lower-level cache 114(2) or the associated slice 118(2) of the higher-level cache memory 116, as indicated by "L2[B]=I" and "L3[B]=I", respectively. The lower-level cache memory 114(X) of the CPU core 102(X) contains a "clean" (e.g., unmodified) version of the shared cache line from memory address "B," as indicated by "L2[B]=SC" but the slice 118(X) of the higher-level cache memory 116 does contain a valid version, as indicated by "L3[B]=I". The cache manager circuit 104 indicates that, in the initial state in FIG. 3, the CPU cores 102(1) and 102(X) contain valid versions of the cache line for memory address "B" as indicated by the status indicator "ST[B]=(1, . . . , 0, 1, 0)".

The message 302(1) is transmitted from the CPU core 102(1) to the cache manager circuit 104, which manages cache coherence, to inform the cache manager circuit 104 of the need to evict the cache line for memory address "B." The message 302(1) may be transferred on the Request channel 128. In response, the cache manager circuit 104 selects one of the slices 118(0)-118(X) as a destination for the evicted cache line of memory address "B." This selection may be based on an algorithm, such as first-in-first-out (FIFO) or least recently used (LRU), for example, but any appropriate method may be employed.

In this example, the cache manager circuit 104 receives the message 302(1) and selects the slice 118(2) of the higher-level cache memory 116 associated with the CPU core 102(2) ("target CPU core") to store the first cache line 126(1). The cache manager circuit 104 generates and transmits message 302(2) regarding the cache line 126(1) to the CPU core 102(2) to notify the CPU core 102(2) that the evicted cache line for memory address "B" is to be stored in the slice 118(2) of the higher-level cache memory 116. The message 302(2) may be transferred on the Snoop channel 134. The CPU core 102(2) responds with message 302(3) to acknowledge the notification from the cache manager circuit 104. The message 302(3) may include an acknowledgment or approval that the cache line may be stored in the slice

118(2). Alternatively, the message 302(3) may comprise an instruction for reading the cache line at memory address "B," where the message 302(3) is directed to the cache manager circuit 104. The message 302(3) may be transferred on the Response channel 130.

The cache manager circuit 104 receives, from the CPU core 102(2), the message 302(3) acknowledging the message 302(2) and/or requesting the cache line 126(1). Based on the message 302(3), the cache manager circuit 104 transmits an identifier of the CPU core 102(2) in the message 302(4). The message 302(4) may also be transferred on the Response channel 130. In some examples, the cache manager circuit 104 may write an identifier of the CPU core 102(2) into a source identifier field of the message 302(4) rather than an identifier of the cache manager circuit 104 actually sending the message 302(4).

Based on the identifier received in the message 302(4), the CPU core 102(1) identifies the second CPU core 102(2) as having an associated first slice 118(2) of the plurality of slices 118(0)-118(X) in which to store the first cache line 126(1). The CPU core 102(1) generates message 302(5), transmitting the cache line 126(1) to the CPU core 102(2) for storage in the first slice 118(2). The message 302(5) may be transferred on the Data channel 132. For example, the message 302(5) may include the identifier of the target CPU core 102(2) in a target identifier field of the message 302(5). In this regard, the message 302(5) may be sent directly to the CPU core 102(2) from the CPU core 102(1) on the system interface 106. The CPU core 102(1) updates the status indicator of the lower-level cache memory 114(1) to "L2 [B]=I" to indicate the cache line is not valid in the lower-level cache memory 114(1).

The CPU core 102(2) receives the cache line 126(1) for memory address "B" and updates the status indicators of the higher-level cache memory 116 to "L3[B]=SD", indicating that a shared, dirty version of the cache line for memory address "B" is stored in the first slice 118(2) of the higher-level cache memory 116. The status indicators for the lower-level cache memory 114(2) remain the same (i.e., "L2[B]=I"), indicating that there is not a valid version of the cache line for memory address "B" stored therein.

Finally, the CPU core 102(2) completes the eviction of the cache line for memory address "B," which includes transmitting, to the cache manager circuit 104, a message 302(6) to acknowledge receipt of the cache line 126(1) for memory address "B," which may be interpreted as an indication that the cache line 126(1) has been stored in the first slice 118(2). The message 302(6) may be transferred on the Response channel 130. The cache manager circuit 104 updates the status indicators to "ST[B]=(1, . . . , 1, 0, 0)" to indicate that valid versions of the cache line for memory address "B" may be found in only the CPU cores 102(2) and 102(X).

FIG. 4 is a flow chart of an exemplary process 400 in a multi-core processor, such as the processor 100 in FIG. 1, of the CPU core 102(1) evicting a cache line 126(1), the process including a direct transfer of the evicted cache line from a lower-level cache 114(1) in the source CPU core 102(1) to a first slice 118(2) of a higher-level cache memory 116 in a target CPU core 102(2) according to an exemplary protocol disclosed herein, to reduce the number of transfers on a system interface 106 compared to the conventional protocol.

The process 400 includes determining, in the first CPU core 102(1), to evict a first cache line 126(1) from an associated lower-level cache memory 114(1) among a plurality of lower-level cache memories in a cache memory system (block 402). The process 400 further includes identifying a first slice 118(2) of a plurality of slices 118(0)-118(X) of the higher-level cache memory 116 associated with a target CPU core 102(2) in which to store the first cache line 126(1) (block 404). The process 400 further includes transmitting the first cache line 126(1) to the target CPU core 102(2) among the plurality of CPU cores 102(0)-102(X) for storage in the first slice 118(2) (block 406).

FIG. 5 illustrates an example of a processor-based system 500, including a multi-core processor 502 ("processor 502") that may be the same or similar to the processor 100 in FIG. 1 and in which CPU cores 504(0)-504(X) (where X is any positive integer number) are each associated with one of a plurality of lower-level cache memories 506(0)-506(X) and also associated with one of a plurality of slices 508(0)-508(X) of a higher-level cache memory 510 in a cache memory system 512. Each of the CPU cores 504(0)-504(X) may be capable of performing the process 400 in FIG. 4. The multi-core processor 502 may be coupled to a system bus 514 (system interface) that is further coupled to a system memory 516, which may include a memory array 517(A) and a memory drive 517(B).

Other master and slave devices can be connected to the system bus 514 of the processor-based system 500. As illustrated in FIG. 5, these devices can include one or more input devices 518, one or more output devices 520, one or more network interface devices 522, and one or more display controllers 524, as examples. The input device(s) 518 can include any type of input device, including, but not limited to, input keys, switches, voice processors, etc. The output device(s) 520 can include any type of output device, including, but not limited to, audio, video, other visual indicators, etc. The network interface device(s) 522 can be any device configured to allow the exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 522 can be configured to support any type of communications protocol desired.

The processor 502 may also be configured to access the display controller(s) 524 over the system bus 514 to control information sent to one or more displays 528. The display controller(s) 524 sends information to the display(s) 528 to be displayed via one or more video processors 530, which process the information to be displayed into a format suitable for the display(s) 528. The display(s) 528 can include any type of display, including, but not limited to, a cathode ray tube (CRT), a liquid crystal display (LCD), a plasma display, a light emitting diode (LED) display, etc. The processor 502 and their associated lower-level cache memories 506(0)-506(X), the system memory 516, the network 526, the input devices 518, and/or the display controller 524 can include computer instructions 532 in non-transitory computer-readable media 534 to control their respective functions.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A processor, comprising:

a cache memory system comprising:

a plurality of lower-level cache memories; and a higher-level cache memory comprising a plurality of slices that each provide a portion of the higher-level cache memory;

a cache manager circuit configured to maintain data coherence in the cache memory system; and a plurality of central processing unit (CPU) cores each associated with a corresponding one of the plurality of lower-level cache memories and a corresponding slice of the plurality of slices of the higher-level cache memory;

wherein a first CPU core of the plurality of CPU cores is configured to:

determine to evict a first cache line from the associated lower-level cache memory of the plurality of lower-level cache memories;

identify a second CPU core of the plurality of CPU cores comprising the associated first slice of the plurality of slices in which to store the first cache line; and transmit the first cache line to the second CPU core for storage in the first slice.

2. The processor of claim 1, wherein to identify the first slice, the first CPU core is further configured to:

send a first message to the cache manager circuit indicating eviction of the first cache line; and receive, from the cache manager circuit, a second message comprising an identifier of the second CPU core.

3. The processor of claim 2, wherein the first CPU core is further configured to transmit the first cache line directly to the second CPU core on a system interface.

4. The processor of claim 3, wherein the cache manager circuit is further configured to:

receive the first message from the first CPU core;

select the slice of the higher-level cache memory to store the first cache line;

transmit a third message regarding the first cache line to the second CPU core;

receive, from the second CPU core, a fourth message acknowledging the third message; and transmit an identifier of the second CPU core to the first CPU core.

5. The processor of claim 4, wherein the cache manager circuit is further configured to:

receive the third message on a request channel of the system interface; and transmit the fourth message on a snoop channel of the system interface.

6. The processor of claim 4, wherein the second CPU core is configured to:

receive the third message from the cache manager circuit;

transmit the fourth message to the cache manager circuit;

receive the first cache line from the first CPU core;

store the first cache line in the first slice of the plurality of slices; and transmit, to the cache manager circuit, a fifth message acknowledging receipt of the first cache line.

7. The processor of claim 6, wherein the second CPU core is configured to:

transmit the third message to the cache manager circuit on a response channel of the system interface;

receive the first cache line from the first CPU core on a data channel of the system interface; and transmit the fifth message to the cache manager circuit on the response channel.

8. The processor of claim 6, wherein the cache manager circuit is further configured to receive the fifth message from the second CPU core acknowledging receipt of the first cache line.

9. A method to evict a first cache line from a lower-level cache memory associated with a first central processor unit (CPU) core among a plurality of CPU cores of a processor, the method comprising:

determining, in the first CPU core, to evict the first cache line from the associated lower-level cache memory among a plurality of lower-level cache memories in a cache memory system;

identifying a first slice of a plurality of slices of a higher-level cache associated with a target CPU core in which to store the first cache line; and transmitting the first cache line to the target CPU core among the plurality of CPU cores for storage in the first slice.

10. The method of claim 9, wherein identifying the first slice further comprises the first CPU core:

sending a first message to a cache manager circuit indicating eviction of the first cache line; and receiving, from the cache manager circuit, a second message comprising an identifier of a second CPU core.

11. The method of claim 10, further comprising the first CPU core transmitting the first cache line directly to the second CPU core on a system interface.

12. The method of claim 11, further comprising the cache manager circuit:

receiving the first message from the first CPU core;

determining the identifier of the second CPU core;

transmitting a third message regarding the first cache line to the second CPU core;

receiving, from the second CPU core, a fourth message acknowledging the third message; and transmitting the identifier of the second CPU core to the first CPU core.

13. The method of claim 12, further comprising the cache manager circuit:

receiving the third message on a request channel of the system interface; and transmitting the fourth message on a snoop channel of the system interface.

14. The method of claim 12, further comprising the second CPU core:

receiving the third message from the cache manager circuit;

transmitting the fourth message to the cache manager circuit;

receiving the first cache line from the first CPU core;

storing the first cache line in the first slice of the plurality of slices; and transmitting, to the cache manager circuit, a fifth message acknowledging receipt of the first cache line.

15. The method of claim 14, further comprising the second CPU:

transmitting the third message to the cache manager circuit on a response channel of the system interface;

receiving the first cache line from the first CPU core on a data channel of the system interface; and transmitting the fifth message to the cache manager circuit on the response channel.

16. The method of claim 13, further comprising the cache manager circuit receiving a fifth message from the second CPU core acknowledging receipt of the first cache line.

17. A non-transitory computer-readable medium having stored thereon computer-executable instructions which, when executed by a multi-core processor, cause the multi-core processor to evict a first cache line from a lower-level cache memory associated with a first central processor unit (CPU) core among a plurality of CPU cores of the multi-core processor, wherein evicting the first cache line comprises:

determine, in the first CPU core, to evict the first cache line from the associated lower-level cache memory among a plurality of lower-level cache memories in a cache memory system;

identify a first slice of a plurality of slices of a higher-level cache associated with a target CPU core in which to store the first cache line; and transmit a first cache line to the target CPU core among the plurality of CPU cores for storage in the first slice.

18. The non-transitory computer-readable medium of claim 17, wherein the computer-executable instructions, when executed by the multi-core processor, further cause the multi-core processor to:

send a first message to a cache manager circuit indicating eviction of the first cache line; and receive, from the cache manager circuit, a second message comprising an identifier of a second CPU core.

19. The non-transitory computer-readable medium of claim 18, wherein the computer-executable instructions, when executed by the multi-core processor, further cause the cache manager circuit to:

receive the first message from the first CPU core;

determine the identifier of the second CPU core;

transmit a third message regarding the first cache line to the second CPU core;

receive, from the second CPU core, a fourth message acknowledging the third message; and transmit the identifier of the second CPU core to the first CPU core.

20. The non-transitory computer-readable medium of claim 19, wherein the computer-executable instructions, when executed by the multi-core processor, further cause the second CPU core to:

receive the third message from the cache manager circuit;

transmit the fourth message to the cache manager circuit;

receive the first cache line from the first CPU core;

store the first cache line in the first slice of the plurality of slices; and transmit, to the cache manager circuit, a fifth message acknowledging receipt of the first cache line.

21. The non-transitory computer-readable medium of claim 20, wherein the computer-executable instructions, when executed by the multi-core processor, further cause the second CPU to:

transmit the third message to the cache manager circuit on a response channel of a system interface;

receive the first cache line from the first CPU core on a data channel of the system interface; and transmit the fifth message to the cache manager circuit on the response channel.

* * * * *